United States Patent
Deng

(10) Patent No.: US 11,645,535 B2
(45) Date of Patent: May 9, 2023

(54) NORMALIZATION METHOD FOR TRAINING DEEP NEURAL NETWORKS

(71) Applicant: Samsung Electronics Co., Ltd., Suwon-si (KR)

(72) Inventor: Weiran Deng, Woodland Hills, CA (US)

(73) Assignee: SAMSUNG ELECTRONICS CO., LTD.

(*) Notice: Subject to any disclaimer, the term of this patent is extended or adjusted under 35 U.S.C. 154(b) by 1217 days.

(21) Appl. No.: 16/186,468

(22) Filed: Nov. 9, 2018

(65) Prior Publication Data

US 2020/0097829 A1 Mar. 26, 2020

Related U.S. Application Data

(60) Provisional application No. 62/735,843, filed on Sep. 24, 2018.

(51) Int. Cl.
*G06N 3/08* (2023.01)
*G06F 7/544* (2006.01)
*G06F 5/01* (2006.01)
*G06N 3/084* (2023.01)

(52) U.S. Cl.
CPC .............. *G06N 3/084* (2013.01); *G06F 5/01* (2013.01); *G06F 7/5443* (2013.01)

(58) Field of Classification Search
CPC ............ G06N 3/084; G06F 5/01; G06F 7/554
See application file for complete search history.

(56) References Cited

U.S. PATENT DOCUMENTS

| | | | |
|---|---|---|---|
| 9,965,705 B2 | 5/2018 | Chen et al. | |
| 2016/0162805 A1 | 6/2016 | Kwon | |
| 2016/0328646 A1 | 11/2016 | Lin et al. | |
| 2018/0107925 A1 | 4/2018 | Choi et al. | |
| 2018/0144242 A1 | 5/2018 | Simard | |
| 2020/0134461 A1* | 4/2020 | Chai | G06N 3/088 |

FOREIGN PATENT DOCUMENTS

WO 2018058509 A1 4/2018

* cited by examiner

*Primary Examiner* — Michael D. Yaary
(74) *Attorney, Agent, or Firm* — Renaissance IP Law Group LLP

(57) ABSTRACT

A system and a method to normalize a deep neural network (DNN) in which a mean of activations of the DNN is set to be equal to about 0 for a training batch size of 8 or less, and a variance of the activations of the DNN is set to be equal to about a predetermined value for the training batch size. A minimization module minimizes a sum of a network loss of the DNN plus a sum of a product of a first Lagrange multiplier times the mean of the activations squared plus a sum of a product of a second Lagrange multiplier times a quantity of the variance of the activations minus one squared.

10 Claims, 2 Drawing Sheets

NORMALIZATION METHOD FOR TRAINING DEEP NEURAL NETWORKS

CROSS-REFERENCE TO RELATED APPLICATION

This application claims the priority benefit under 35 U.S.C. § 119(e) of U.S. Provisional Application No. 62/735,843 filed on Sep. 24, 2018, the disclosure of which is incorporated herein by reference in its entirety.

TECHNICAL FIELD

The subject matter disclosed herein relates to neural networks. More specifically, the subject matter disclosed herein relates to a system and a method to normalize a deep neural network using small training batch sizes.

BACKGROUND

Training of deep neural networks (DNNs) may turn into an extremely time-consuming process. The magnitude of parameters of a DNN that are to be trained may be extremely large, so normalization techniques are used minimize the range of perturbation in gradient values and help to stabilize the convergence.

SUMMARY

An example embodiment provides a method to normalize a deep neural network (DNN), in which the method may include: setting a mean of activations of the DNN to be equal to about 0 for a training batch size of 8 or less; setting a variance of the activations of the DNN to be equal to about a predetermined value for the training batch size; and minimizing by a minimization module a sum of a network loss of the DNN plus a sum of a product of a first Lagrange multiplier times the mean of the activations squared plus a sum of a product of a second Lagrange multiplier times a quantity of the variance of the activations minus one squared. In one embodiment, the minimizing may further include summing by a first summer the network loss, the product of the first Lagrange multiplier and the mean of the activations squared, and the product of the second Lagrange multiplier and the quantity of the variance of the activations minus one squared. In another embodiment, the method may further include: forming by a first multiplier the product of the first Lagrange multiplier and the mean of the activations squared; and forming by a second multiplier the product of the second Lagrange multiplier and the quantity of the variance of the activations minus one squared.

An example embodiment provides a system to normalize a deep neural network (DNN) that includes a first multiplier, a second multiplier, a summer and a minimizer. The first multiplier may iteratively form a product of a first Lagrange multiplier times a mean of activations of the DNN squared for a training batch size of 8 or less. The second multiplier may iteratively form a product of a second Lagrange multiplier times a quantity of a variance of the activations of the DNN minus one squared. The summer may iteratively form a sum of an output of the first multiplier and an output of the second multiplier. The minimizer may determine a minimal overall network loss of the iteratively formed sum formed by the summer. In one embodiment, a mean of the activations of the DNN is set to be equal to about 0 for the training batch size, and a variance of the activations of the DNN is set to be equal to about a predetermined value for the training batch size. In another embodiment, the predetermined value is trainable, and the training batch size is 1. In still another embodiment, activations of the DNN may be updated during back-propagation using a gradient descent technique, and the first and second Lagrange multipliers may be updated during back-propagation using a gradient ascent technique.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
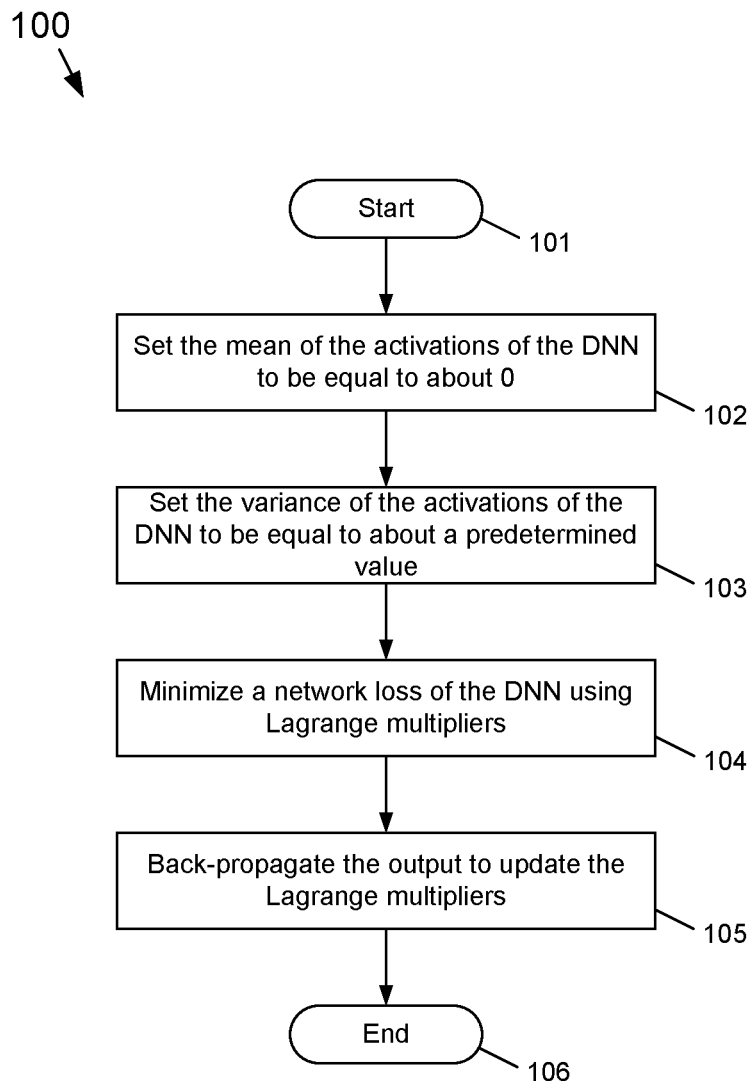
FIG. 1 is a flow diagram of an example embodiment of a method to normalize a DNN based on a training batch size of 8 or less according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein. Additionally, the described aspects can be implemented to perform low power, 3D-depth measurements in any imaging device or system, including, but not limited to, a smartphone, a User Equipment (UE), and/or a laptop computer.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein provides a normalization technique for training of DNNs for training batch sizes of 8 or less. The equality constraint on the mean and variance of the activations in each hidden layer may be augmented into the loss function. Accordingly, the training may then be formulated as a minimization problem combined with the equality constraints and solved using a method of Lagrange multipliers.

Normalization techniques used in the training of deep neural networks (DNN) improve the training convergences by reducing internal covariate shift (ICS). ICS is the change in the distribution of DNN activations due to the change in weights during training. A small change in the network activation may be amplified further down the network during forward and backward propagations. A commonly used normalization technique is batch normalization (BN). BN may be applied in the following way. First, the mean $\mu_k$ and variance $v_k$ are determined for each channel in which k is the index of the channel. Then, the activation $x_k$ is normalized to have zero mean and unitary variance by $$\hat{x}_k = \frac{x_k - \mu_k}{\sqrt{v_k + \varepsilon}}, \quad (1)$$

in which $\varepsilon$ is used to prevent a division-by-zero condition. The normalized activation, however, needs to scaled and shifted so that the values of the activation are not confined to the linear region of a nonlinear activation function.

Two parameters $\gamma_k$ and $\beta_k$ may be applied to the normalized activation as $$y_k = \gamma_k \hat{x}_k + \beta_k. \quad (2)$$

The parameters $\gamma_k$ and $\beta_k$ may be trainable and may be updated during back-propagation. The BN normalization technique has been shown effective in variety of DNN architectures, such as the architectures of the Inception and ResNet DNNs. For training a DNN with small batch sizes (less than eight), however, the BN normalization technique usually fails due to insufficient statistical power to estimate the mean and variances. In particular, for training using batch size of one, the BN normalization technique does not work. Therefore, BN is not compatible with mobile platforms in which the on-device training only works with small training batch size (most likely one) due to the limited on-device memory.

To overcome this problem, the subject matter disclosed herein provides a normalization method that controls the ICS. From Eq. (1), the normalized activations have a zero mean and unitary variances. This condition can be explicitly controlled using an extra parameter and the training can be formulated as a problem of minimizing the network loss subject to multiple hard constraints that requires the activations to have zero means and unitary variances.

The network loss $L_{net}$ may be defined as:

$$L_{net} = (y_{(L)} - T)^2. \tag{3}$$

The network has L layers. The target label is defined as T, and $y_L$ is the output from the last layer. The hard constraint is $$u_{(l),k} = 0 \tag{4}$$

for the mean of the activations and $$v_{(l),k} = 1. \tag{5}$$

for the variances of the activations. Here, l is the layer index and k is the channel index.

The training problem may be formulated as $$\underset{w}{\operatorname{argmin}}\{L_{net}\}, \text{ s.t. } \mu_{(l),k} = 0 \text{ and } v_{(l),k} = 1. \tag{6}$$

in which $l \in [1, L]$ and $k \in [1, N_k]$.

The overall loss for the constrained minimization is:

$$L = L_{net} + \Sigma_{l,k}\lambda_{(l),k} \times \mu_{(l),k}^2 + \Sigma_{l,k}\rho_{(l),k} \times (v_{(l),k} - 1)^2 \tag{7}$$

in which $\lambda_{(l),k}$ and $\rho_{(l),k}$ are Lagrange multipliers.

This minimization problem with the equality constraint may be solved using Lagrange multipliers or the method of dual ascent with extra regularization terms for the activation means and variations. In a Lagrange multiplier method, the weights may be updated using gradient descent, and the Lagrange multiplier terms are updated using gradient ascent. By increasing the $\lambda_{(l),k}$ and $\rho_{(l),k}$ multipliers, the equality constraints may be kept close to zeros, therefore, guarantees the hard constraint requirement.

FIG. 1 is a flow diagram of an example embodiment of a method 100 to normalize a DNN based on a training batch size of 8 or less according to the subject matter disclosed herein. The method 100 starts at 101. At 102, the mean µ of the activations of the DNN are set to be equal to about 0. At 103, the variance v of the activations of the DNN are set to be about a predetermined trainable value, such as, but not limited to 1. That is, different target variances may be selected. At 104, the overall loss L of, for example, Eq. (7) is minimized using the Lagrange multipliers $\lambda_{(l),k}$ and $\rho_{(l),k}$. In an alternative embodiment, the overall loss L of the DNN may be minimized using a dual-ascent technique with extra regularization terms for the activation means and variations. At 105, the output of the DNN is back-propagated and the Lagrange multipliers $\lambda_{(l),k}$ and $\rho_{(l),k}$ may be updated using a gradient-ascent technique, whereas the weights may be updated using a gradient-descent technique.

Figure 2:
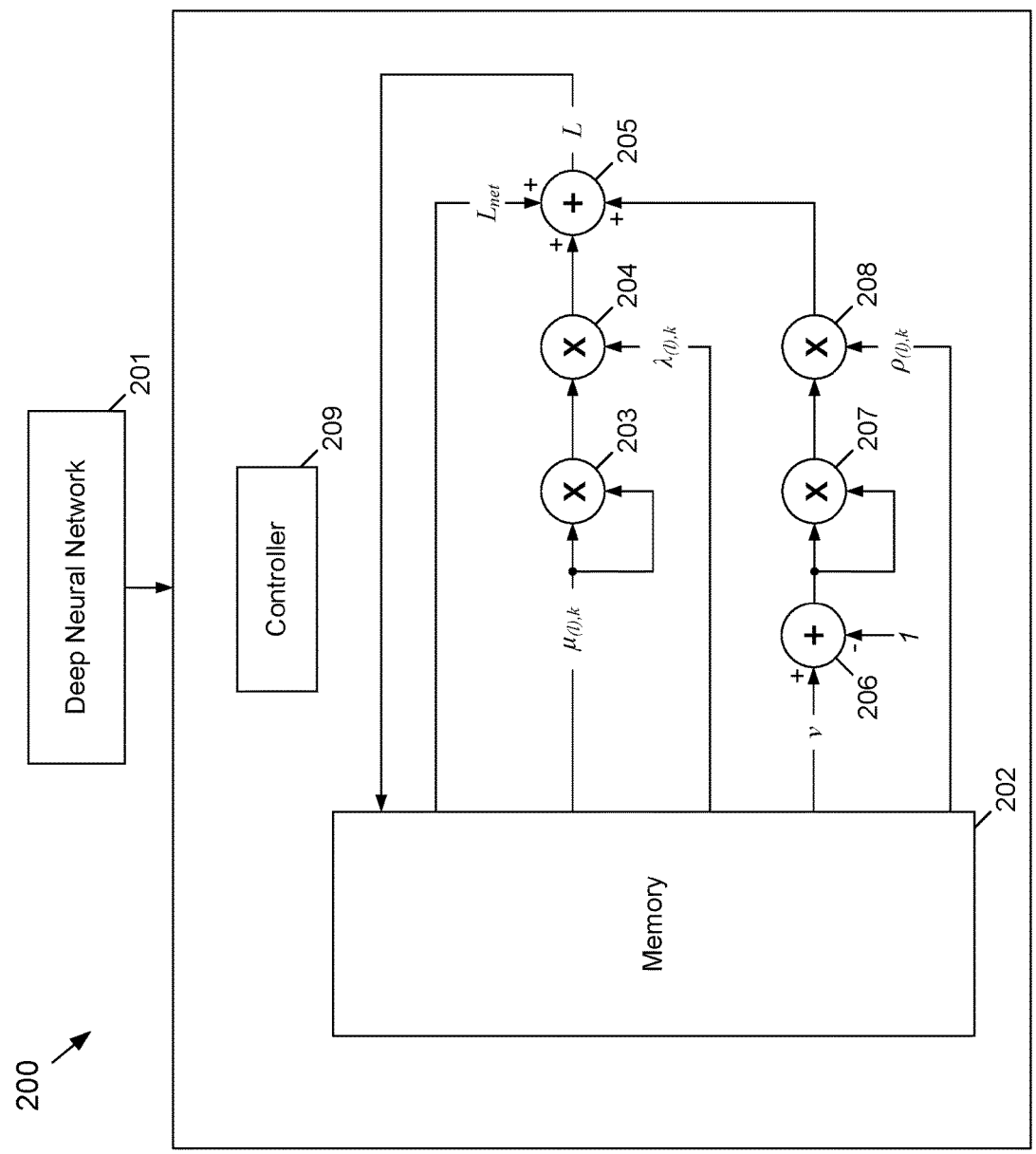
FIG. 2 depicts a functional block diagram of an example embodiment of a system to normalize a DNN based on a training batch size of 8 or less according to the subject matter disclosed herein.

FIG. 2 depicts a functional block diagram of an example embodiment of a system 200 to normalize a DNN based on a training batch size of 8 or less according to the subject matter disclosed herein. The system 200 may include a memory 202, a first multiplier 203, a second multiplier 204, a first adder 205, a second adder 206, a third multiplier 207, and a fourth multiplier 208. In some embodiments, the system 200 may include a controller 209 that may provide control and an iterative-type of functionality. In another embodiment, the system 200 may be embodied as a state machine. In one embodiment, the system 200 may be embodied as a minimization module that may be any combination of software, firmware and/or hardware configured to provide the minimization and arithmetic functionality of the system 200. In another embodiment, one or more of the functional blocks of the system 200 may be modules, in which case such a module may be any combination of software, firmware and/or hardware configured to provide the functionality described herein in connection with the particular module.

The activation values of a deep neural network 201 may be stored in the memory 202 of the system 200. The deep neural network 201 has not been pre-trained. The multipliers 203 and 204 operate to iteratively determine $\lambda_{(l),k} \times \mu_{(l),k}^2$ of, for example, Eq. (7). The output of the multiplier 204 is input to the first adder 205. The second adder 206, the third multiplier 207 and the fourth multiplier 208 operate to iteratively determine $\rho_{(l),k} \times (v_{(l),k} - 1)^2$ of, for example, Eq. (7). The output of the fourth multiplier is input to the first adder 205. The network loss $L_{net}$ is also input to the first adder 205. The output of the first adder 205, which is the overall network loss L, is stored in memory 202 for comparison other iterative results to minimize the overall network loss according to, for example, Eq. 7.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method to normalize a deep neural network (DNN) having K channels and L layers for a training batch size of 8 or less, the method comprising:
multiplying, by a first multiplier circuit, a first value representing a mean of activations for a channel k of a layer l as a first input and as a second input to the first multiplier circuit, and outputting a first product value representing the first value squared;
multiplying, by a second multiplier circuit, the first product value as a first input to the second multiplier circuit and a second value representing a first Lagrange multiplier for the channel k of the layer l as a second input to the second multiplier circuit, and outputting a second product value representing a product of the first product value and the second value for the first Lagrange multiplier;
adding, by a first adder circuit, a third value representing a variance of activations for the channel k of the layer l as a first input to the first adder circuit and a fourth value as a second input to the first adder circuit, and outputting a first summation value representing a summation of the third value and the fourth value;
multiplying, by a third multiplier circuit, the first summation value as a first input and as a second input to the third multiplier circuit, and outputting a third product value representing the first summation value squared;
multiplying, by a fourth multiplier circuit, the third product value as a first input to the fourth multiplier circuit and a fifth value representing a second Lagrange multiplier for the channel k of the layer l as a second input to the fourth multiplier circuit, and outputting a fourth product value representing a product of the third product value and the fifth value for the second Lagrange multiplier; and adding, by a second adder circuit, the second product value as a first input to the second adder circuit, the third product value as a second input to the second adder circuit, and a sixth value representing a network loss as a third input to the second adder circuit, and outputting a second summation value representing an overall network loss.

2. The method of claim 1, wherein the first value is equal to about 0, and wherein the third value is equal to a trainable predetermined value.

3. The method of claim 2, wherein the third value is trainable.

4. The method of claim 2, wherein the training batch size comprises 1.

5. The method of claim 1, further comprising:
updating, by a controller, activations of the DNN during back-propagation using a gradient descent technique; and
updating, by the controller, values representing the first and second Lagrange multipliers during back-propagation using a gradient ascent technique.

6. The method of claim 5, wherein the training batch size comprises 1.

7. A system to normalize a deep neural network (DNN) having K channels and L layers for a training batch size of 8 or less, the system comprising:
a first multiplier circuit configured to receive a first value representing a mean of activations for a channel k of a layer l as a first input and as a second input, and to output a first product value representing the first value squared;
a second multiplier circuit coupled to the first multiplier circuit, the second multiplier circuit being configured to receive the first product value as a first input and a second value representing a first Lagrange multiplier for the channel k of the layer l as a second input, and to output a second product value representing a product of the first product value and the second value for the first Lagrange multiplier;
a first adder circuit configured to receive a third value representing a variance of activations for the channel k of the layer l as a first input and a fourth value as a second input, and to output a first summation value representing a summation of the third value and the fourth value;
a third multiplier circuit coupled to the first adder circuit, the third multiplier circuit being configured to receive the first summation value as a first input and as a second input, and to output a third product value representing the first summation value squared;
a fourth multiplier circuit coupled to the third multiplier circuit, the fourth multiplier circuit being configured to receive the third product value as a first input and a fifth value representing a second Lagrange multiplier for the channel k of the layer l as a second input, and to output a fourth product value representing a product of the third product value and the fifth value for the second Lagrange multiplier; and
a second adder circuit coupled to the second multiplier circuit and the fourth multiplier circuit, the second adder circuit being configured to receive the second product value as a first input, the third product value as a second input, and a sixth value representing a network loss as a third input, and to output a second summation value representing an overall network loss.

8. The system of claim 7, wherein the first value is equal to about 0, and wherein the third value is equal to a predetermined value.

9. The system of claim 8, wherein the third value is trainable.

10. The system of claim 7, wherein the training batch size is 1.

* * * * *